(12) United States Patent
Horiuchi et al.

(10) Patent No.: US 9,398,608 B2
(45) Date of Patent: Jul. 19, 2016

(54) PREVENTING ERRONEOUS DETECTION OF A DATA RESOURCE REGION DUE TO AN ERROR IN DETECTION OF A CONTROL SIGNAL

(75) Inventors: Ayako Horiuchi, Kanagawa (JP); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 119 days.

(21) Appl. No.: 14/127,323

(22) PCT Filed: Jun. 13, 2012

(86) PCT No.: PCT/JP2012/003866
§ 371 (c)(1),
(2), (4) Date: Dec. 18, 2013

(87) PCT Pub. No.: WO2013/001733
PCT Pub. Date: Jan. 3, 2013

(65) Prior Publication Data
US 2014/0133422 A1 May 15, 2014

(30) Foreign Application Priority Data
Jun. 27, 2011 (JP) .................... 2011-141683

(51) Int. Cl.
*H04W 72/12* (2009.01)
*H04L 1/00* (2006.01)
*H04W 72/04* (2009.01)
*H04L 5/00* (2006.01)

(52) U.S. Cl.
CPC ......... *H04W 72/1273* (2013.01); *H04L 1/0023* (2013.01); *H04L 5/0091* (2013.01); *H04W 72/04* (2013.01); *H04L 5/0044* (2013.01); *H04L 5/0053* (2013.01)

(58) Field of Classification Search
None
See application file for complete search history.

(56) References Cited

U.S. PATENT DOCUMENTS

2011/0044391 A1* 2/2011 Ji ........................ H04L 5/0007
375/260
2011/0249640 A1* 10/2011 Soong ................ H04B 7/2606
370/329

(Continued)

FOREIGN PATENT DOCUMENTS

JP  WO2010/073702 A1 *  1/2010  ............ H04W 72/04
KR  WO 2011013962 A2 *  2/2011  ............ H04B 7/2606

OTHER PUBLICATIONS

Chen et al., LTE Rel.11 PDCCH and PHICH Enhancements, U.S. Appl. No. 61/438,848, filed Mar. 2011.*

(Continued)

*Primary Examiner* — Ian N Moore
*Assistant Examiner* — Justin T. Van Roie
(74) *Attorney, Agent, or Firm* — Pearne & Gordon LLP

(57) ABSTRACT

A transmitter device is capable of preventing error detection of a data resource area as a result of a detection mistake of a control signal. In the device, a control unit sets, as data resource areas, only PRBs that have been imparted with numbers greater than a number that has been imparted to a PRB for which has been set a control resource area for which a downlink assignment control signal (that is, a DL grant) has been mapped. In this manner, at a terminal, if the PRB for which a downlink assignment control signal has been detected can be identified, the data resource area can be identified directly, and therefore, it is possible to prevent error detection for the data resource area as a result of a detection mistake of an uplink assignment control signal.

4 Claims, 16 Drawing Sheets

(56) References Cited

U.S. PATENT DOCUMENTS

| | | | |
|---|---|---|---|
| 2012/0120868 A1* | 5/2012 | Park | H04B 7/2606 370/315 |
| 2012/0275400 A1* | 11/2012 | Chen et al. | 370/329 |
| 2013/0155996 A1* | 6/2013 | Horiuchi | H04W 72/0406 370/329 |
| 2014/0092792 A1* | 4/2014 | Kim et al. | 370/280 |

OTHER PUBLICATIONS

International Search Report for Application No. PCT/JP2012/003866 dated Jul. 17, 2012.
ZTE, The mapping schemes of R-PDCCH, TSG-RAN WG1 #61, R1-102915, May 14, 2010, p. 1-5.
Samsung, Discussion on Downlink Control Channel Enhancement, 3GPP TSG-RAN1 Meeting #65, R1-111471, May 13, 2011 p. 1-4.
NTT DOCOMO, DL Control Channel Enhancement for DL MIMO in Rel-11, 3GPP TSG RAN WG1 Meeting #65, R1-111636, May 13, 2011, p. 1-6.
Motorola, R-PDCCH search space design, 3GPP TSG-RAN WG1 #62b, R1-105618, Oct. 15, 2010, p. 1-4.
3GPP TS 36.216 v10.1.0, 3rd Generation Partnership Project; Technical Specification Group Radio Access Network; Evolved Universal Terrestrial Radio Access (E-UTRA); Physical layer for relaying operation (Release 10) Dec. 2010.

* cited by examiner

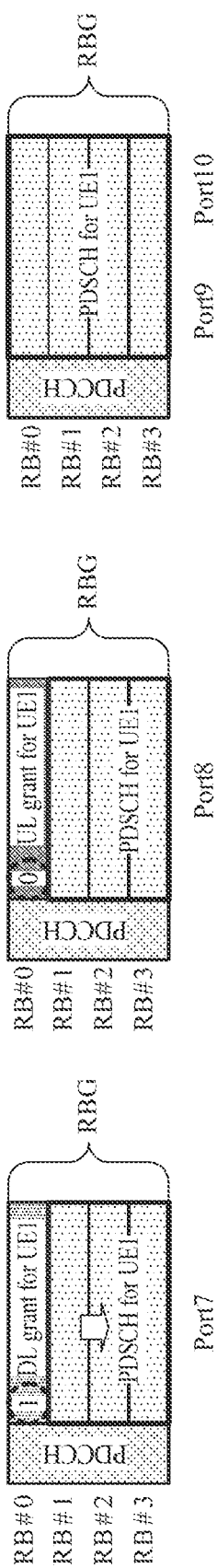

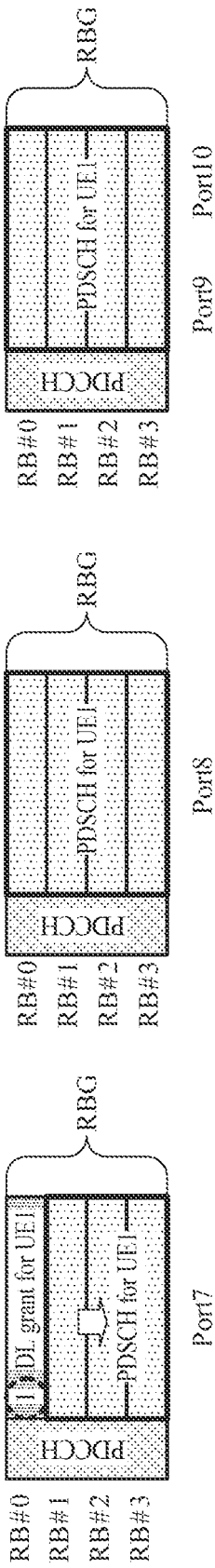

PREVENTING ERRONEOUS DETECTION OF A DATA RESOURCE REGION DUE TO AN ERROR IN DETECTION OF A CONTROL SIGNAL

TECHNICAL FIELD

The present invention relates to a transmission apparatus, a reception apparatus, a transmission method, and a reception method.

BACKGROUND ART

In recent years, it has become common to transmit not only audio data but also large-volume data such as still image data and moving image data in cellular mobile communication systems, in response to spread of multimedia information. Active studies associated with techniques for achieving a high transmission rate in a high-frequency radio band has been conducted to achieve large-volume data transmission.

When a high frequency radio band is utilized, however, attenuation increases as the transmission distance increases, although a higher transmission rate can be expected within a short range. Accordingly, the coverage area of a radio communication base station apparatus (hereinafter, abbreviated as "base station") decreases when a mobile communication system using a high frequency radio band is actually put into operation. Thus, more base stations need to be installed in this case. The installation of base stations involves reasonable costs, however. For this reason, there has been a high demand for a technique that provides a communication service using a high-frequency radio band, while limiting an increase in the number of base stations.

In order to meet such a demand, studies have been carried out on a relay technique in which a radio communication relay station apparatus (hereinafter, abbreviated as "relay station") is installed between a base station and a radio communication mobile station apparatus (hereinafter, abbreviated as "mobile station") to perform communication between the base station and mobile station via the relay station for the purpose of increasing the coverage area of each base station. The use of relay technique allows a mobile station not capable of directly communicating with a base station to communicate with the base station via a relay station.

An LTE-A (long-term evolution advanced) system for which the introduction of the relay technique described above has been studied is required to maintain compatibility with LTE (long term evolution) in terms of a smooth transition from and coexistence with LTE. For this reason, mutual compatibility with LTE is required for the relay technique as well.

FIG. 1 illustrates example frames in which control signals and data are assigned in the LTE system and the LTE-A system.

In the LTE system, DL (downlink) control signals from a base station to a mobile station are transmitted through a DL control channel, such as PDCCH (physical downlink control channel). In LTE, DL grant (also called DL assignment) indicating DL data assignment and UL (uplink) grant indicating UL data assignment are transmitted through PDCCH. DL grant reports that a resource in the subframe in which the DL grant is transmitted has been allocated to the mobile station. Meanwhile, in an FDD system, UL grant reports that a resource in the fourth subframe after the subframe in which the UL grant is transmitted has been allocated to the mobile station. In a TDD system, a UL grant reports that the resource in a subframe transmitted after four or more subframes from the subframe in which the UL grant is transmitted has been allocated to the mobile station. In the TDD system, the subframe to be assigned to the mobile station, or the number of subframes before the assigned subframe in which the UL grant is transmitted is determined in accordance with the time-division pattern of the UL and DL (hereinafter referred to as "UL/DL configuration pattern"). Regardless of the UL/DL configuration pattern, the UL subframe is at least the fourth subframe after the subframe in which the UL grant is transmitted or is a subframe after the fourth subframe.

In the LTE-A system, relay stations, in addition to base stations, also transmit control signals to mobile stations in PDCCH regions in the top parts of subframes. With reference to a relay station, DL control signals have to be transmitted to a mobile station. Thus, the relay station switches the processing to reception processing after transmitting the control signals to the mobile station to prepare for receiving signals transmitted from the base station. The base station, however, transmits DL control signals to the relay station at the time the relay station transmits the DL control signals to the mobile station. The relay station therefore cannot receive the DL control signals transmitted from the base station. In order to avoid such inconvenience in the LTE-A, studies have been carried out on providing a region to which downlink control signals for relay stations are mapped (i.e., relay PDCCH (R-PDCCH) region) in a data region as illustrated in FIG. 2 in LTE-A. Similar to the PDCCH, mapping a DL grant and UL grant to the R-PDCCH is studied. In the R-PDCCH, as illustrated in FIG. 1, locating the DL grant in the first slot and the UL grant in the second slot is studied (refer to Non-patent Literature 1). Mapping the DL grant in the first slot reduces a delay in decoding the DL grant, and allows relay stations to prepare for ACK/NACK transmission for DL data (transmitted in the fourth subframes following reception of DL grant in FDD). Each relay station finds the downlink control signals intended for the relay station by performing blind-decoding on downlink control signals transmitted using an R-PDCCH region from a base station within a resource region indicated using higher layer signaling from the base station (i.e., search space).

As described above, the base station notifies the relay station of the search space corresponding to the R-PDCCH by higher layer signaling. Notification of the search space corresponding to the R-PDCCH may be performed in two different ways: (1) notification using a PRB (physical resource block) pair as a single unit; or (2) notification using an RBG (resource block group) as a single unit. The term, "PRB (physical resource block) pair" refers to a set of PRBs in the first and second slots, whereas the term, "PRB" refers to an individual PRB in either the first or second slot. Hereinafter, a PRB pair may simply be referred to as "PRB." A resource block group (RBG) is a unit used when a plurality of PRBs are scheduled as a group. The size of an RBG is determined on the basis of the bandwidth of the communication system.

R-PDCCH has four aggregation levels, i.e., levels 1, 2, 4, and 8 (for example, refer to Non-patent Literature (hereinafter, abbreviated as "NPL") 1). Levels 1, 2, 4, and 8 respectively have six, six, two, and two mapping candidate positions. The term "mapping candidate position" refers to a candidate region to which control signals are to be mapped. When a single terminal is set with one aggregation level, control signals are actually mapped to one of the plurality of mapping candidate positions of the aggregation level. FIG. 2 illustrates example search spaces corresponding to R-PDCCH. The ovals represent search spaces at various aggregation levels. The plurality of mapping candidate positions in the search spaces at the different aggregation levels are continuous on VRBs (virtual resource blocks). The mapping candidate positions in the VRBs are mapped to PRBs (physical resource blocks) through higher layer signaling.

Given the introduction of various apparatuses as radio communication terminals in the future M2M (machine to machine) communication, for example, there is a concern for a shortage of resources in the mapping region for PDCCH (i.e., "PDCCH region") due to an increase in the number of terminals. If PDCCH cannot be mapped due to such a resource shortage, the DL data cannot be scheduled for the terminals. Thus, the resource region for mapping DL data (i.e., "PDSCH (physical downlink shared channel) region") cannot be used even if there is an available region, possibly causing a decrease in the system throughput. Studies have been carried out to solve such resource shortage through mapping control signals for terminals served by a base station in a data region to which R-PDCCH is mapped. Then, the resource region including the data region to which the control signal for the terminals served by such a base station is mapped and the data region to which R-PDCCH described above is mapped are referred to an enhanced PDCCH (E-PDCCH) region, a new-PDCCH (N-PDCCH) region, an X-PDCCH region, or the like. Mapping a control signal in a data region in such a manner enables transmission power control for a control signal transmitted to a terminal near a cell edge or interference control for interference to another cell by a control signal to be transmitted or interference to the cell from another cell.

In addition, there is a likelihood that the search space that corresponds to E-PDCCH will be the resource region to which the control signal that is transmitted from the base station to the terminals is mapped. Moreover, the search space that corresponds to E-PDCCH is set for the individual terminals. One part of a design of R-PDCCH also can be used for a design of E-PDCCH, or the design of E-PDCCH can be set to be a design that is entirely different from the design of R-PDCCH. In fact, studies have been also conducted on setting of the design of E-PDCCH and the design of R-PDCCH to be different from each other.

As described above, in the R-PDCCH region, the DL grant is mapped to the first slot, and the UL grant is mapped to the second slot. That is, the resource to which the DL grant is mapped is separated from the resource to which the UL grant is mapped in the time domain. On the other hand, studies have been also conducted on the division of the resource to which the DL grant is mapped and the resource to which the UL grant is mapped in the frequency domain (that is, a subcarrier or a PRB pair) as illustrated in FIG. 3.

CITATION LIST

Non-Patent Literature

NPL 1
3GPP TS 36.216 V10.1.0 Physical layer for relaying operation

SUMMARY OF INVENTION

Technical Problem

Incidentally, when a base station transmits a DL grant and assigns a PDSCH in RBG units to a terminal in an E-PDCCH region, the DL grant and PDSCH may be mapped to the same RBG in a certain subframe. In addition, like the RBG at the top part off FIG. 4, there is a case where both of the DL grant and UL grant are mapped to one RBG, and like the third RBG from the top of FIG. 4, there is a case where only the DL grant is mapped to one RBG. Then, in the RBG to which the DL grant is mapped, a PDSCH can be mapped to the PRB pair excluding a PRB pair to which the DL grant is mapped and a PRB pair to which the UL grant is mapped.

Therefore, when data (PDSCH) is assigned to the PRB pair within an RBG to which the DL grant is mapped, it is necessary to change the data region between cases where a UL grant is mapped within such RBG and where no UL grant is mapped within such RBG. However, currently, a signal indicating whether or not a UL grant is present within an RBG to which a DL grant is mapped is not prepared. Therefore, in the current situation, basically, the data (PDSCH) cannot be assigned to the PRB pair within the RBG to which a DL grant is mapped.

Meanwhile, it is considered that whether or not the UL grant is present is determined by decoding the UL grant in terminals. However, for example, when failing in decoding the UL grant due to poor reception quality, the terminal may determine that the UL grant is not present although the UL grant is present. For this reason, the terminal erroneously recognizes that a PDSCH is mapped to the PRB to which the UL grant is mapped. That is, erroneous recognition of a PDSCH region occurs. Such occurrence of erroneous recognition of a PDSCH region leads to a problem such as deterioration in retransmission efficiency. That is, when hybrid ARQ (HARQ) is performed, the signal that is mapped to the PDSCH region is retained in a buffer. In hybrid ARQ (HARQ), when repeating retransmission, a plurality of items of data that are retained in the buffer are combined. At this time, when the erroneous recognition of the PDSCH region occurs, because the signal that is mapped to the region to which the data is not mapped is retained, as data, in the buffer, the signal that is erroneously recognized as data is combined, and the retransmission efficiency deteriorates.

An object of the present invention is to provide a transmission apparatus, a reception apparatus, a transmission method, and a reception method that are capable of preventing erroneous detection of a data resource region due to an error in detection of a control signal.

Solution to Problem

A transmission apparatus according to an aspect of the present invention is an apparatus configured to map transmission data for a reception apparatus to a data resource region, to map a control signal to a predetermined resource region other than the data resource region and to transmit the transmission data and the control signal to the reception apparatus, the transmission apparatus including: a generation section that generates an assignment control signal for the data resource region; a setting section that sets the data resource region and a control resource region to which the assignment control signal is mapped, within the predetermined resource region in a resource block group (RBG) including a plurality of resource blocks (RBs); and a mapping section that maps the transmission data to the set data resource region and that maps the assignment control signal to the set control resource region, in which the setting section sets, to be the data resource region, at least one RB associated with an RB in which the predetermined resource region is set.

A reception apparatus according to an aspect of the present invention is an apparatus configured to receive data transmitted from a transmission apparatus while being mapped to a data resource region and to receive a received signal that includes a control signal transmitted from the transmission apparatus in a predetermined resource region other than the data resource region, the reception apparatus including: a detection section that detects an assignment control signal for the data resource region, the assignment control signal being included in the received signal; a specification section that specifies a data-extraction-target region that corresponds to the data resource region in a resource block group (RBG) including a plurality of resource blocks (RBs) including an RB in which the assignment control signal is detected; and an extraction section that extracts a data signal within the specified data-extraction-target region from the received signal, in which the data-extraction-target region corresponds to an RB associated with the RB in which the assignment control signal is detected.

A transmission method according to an aspect of the present invention is a method of mapping transmission data for a reception apparatus to a data resource region, mapping a control signal to a predetermined resource region other than the data resource region and transmitting the transmission data and the control signal to the reception apparatus, the transmission method including: generating an assignment control signal for the data resource region; setting the data resource region and a control resource region to which the assignment control signal is mapped, within the predetermined resource region in a resource block group (RBG) including a plurality of resource blocks (RBs); and mapping the transmission data to the set data resource region and mapping the assignment control signal to the set control resource region, in which at least one RB associated with an RB in which the predetermined resource region is set is set to be the data resource region.

A reception method according to an aspect of the present invention is a method of receiving data transmitted from a transmission apparatus while being mapped to a data resource region and receiving a received signal that includes a control signal transmitted from the transmission apparatus in a predetermined resource region other than the data resource region, the reception method including: detecting an assignment control signal for the data resource region, the assignment control signal being included in the received signal; specifying a data-extraction-target region that corresponds to the data resource region in a resource block group (RBG) including M resource blocks (RBs) (where M is a natural number equal to or greater than two) including an RB in which the assignment control signal is detected; and extracting a data signal within the specified data-extraction-target region from the received signal, in which the data-extraction-target region corresponds to an RB associated with the RB in which the assignment control signal is detected.

Advantageous Effects of Invention

According to the invention, it is possible to provide a transmission apparatus, a reception apparatus, a transmission method, and a reception method that are capable of preventing erroneous detection of a data resource region due to an error in detection of a control signal.

BRIEF DESCRIPTION OF DRAWINGS

FIGS. 14A to 14C are diagrams that serve to describe the mapping resource determination rule and the mapping resource specification rule according to Embodiment 3;

FIGS. 16A to 16C are diagrams that serve to describe the mapping resource determination rule and the mapping resource specification rule according to Embodiment 4.

DESCRIPTION OF EMBODIMENTS

Figure 1:
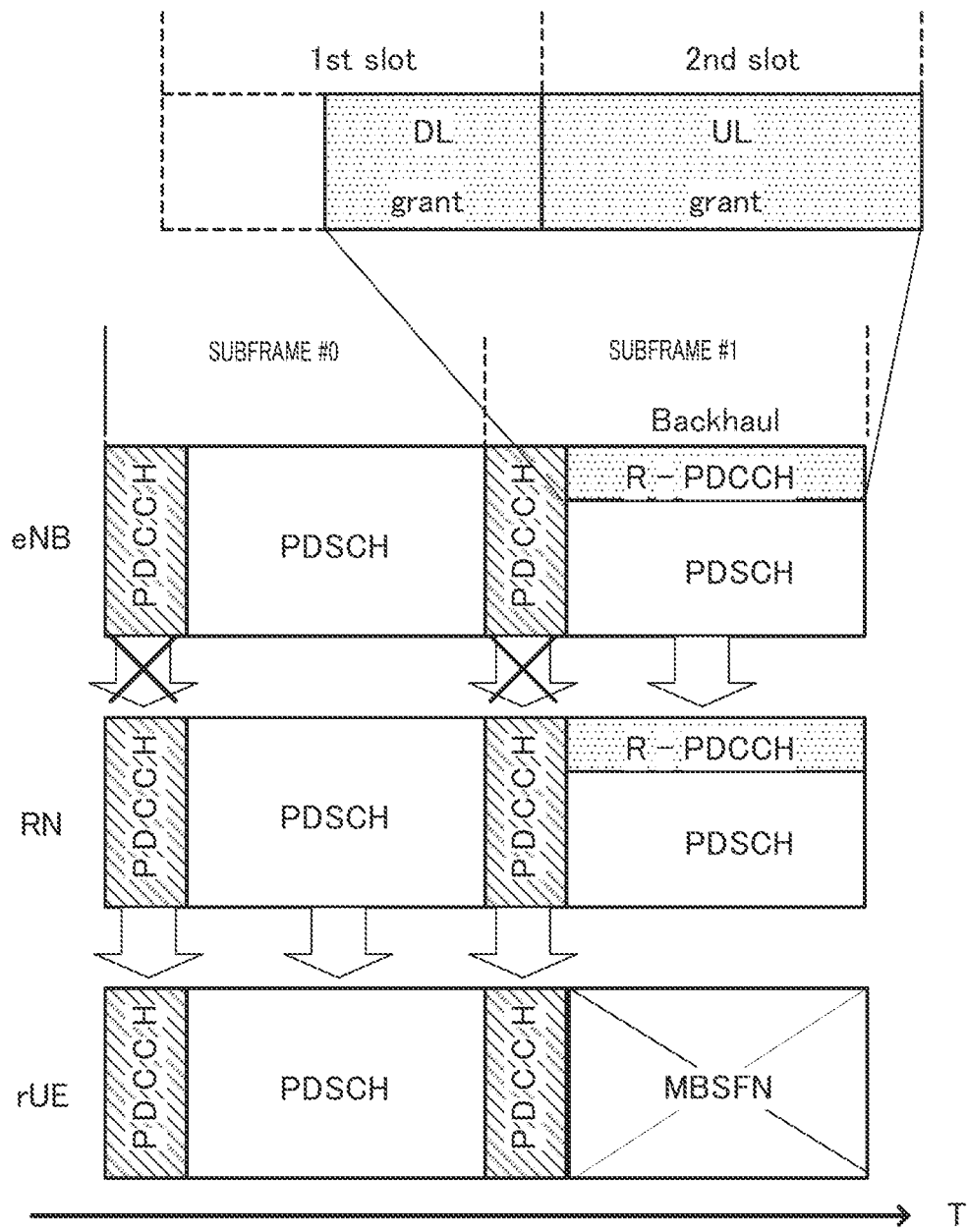
FIG. 1 illustrates example frames containing control signals and data assigned thereto, in the LTE system and the LTE-A system.
Figure 2:
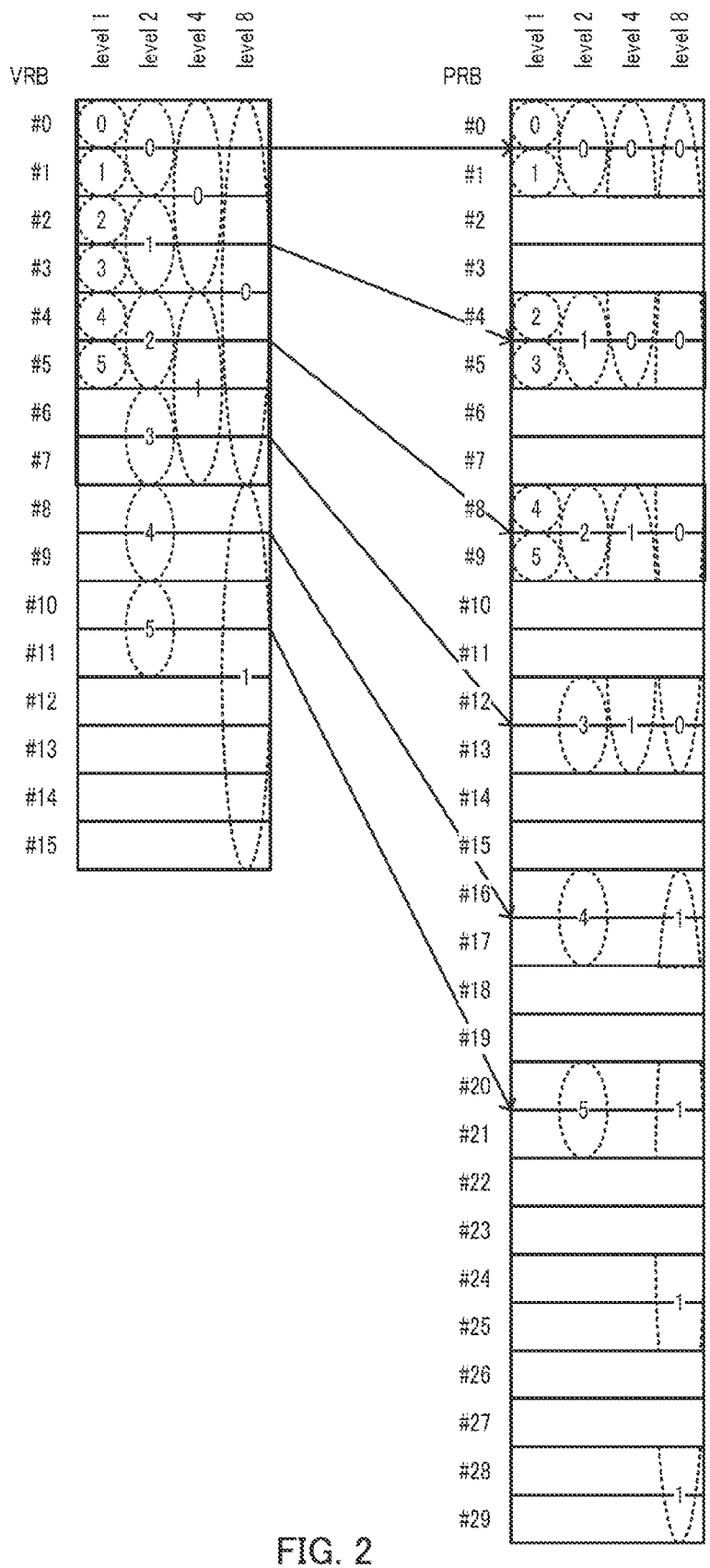
FIG. 2 illustrates example search spaces corresponding to R-PDCCH.
Figure 3:
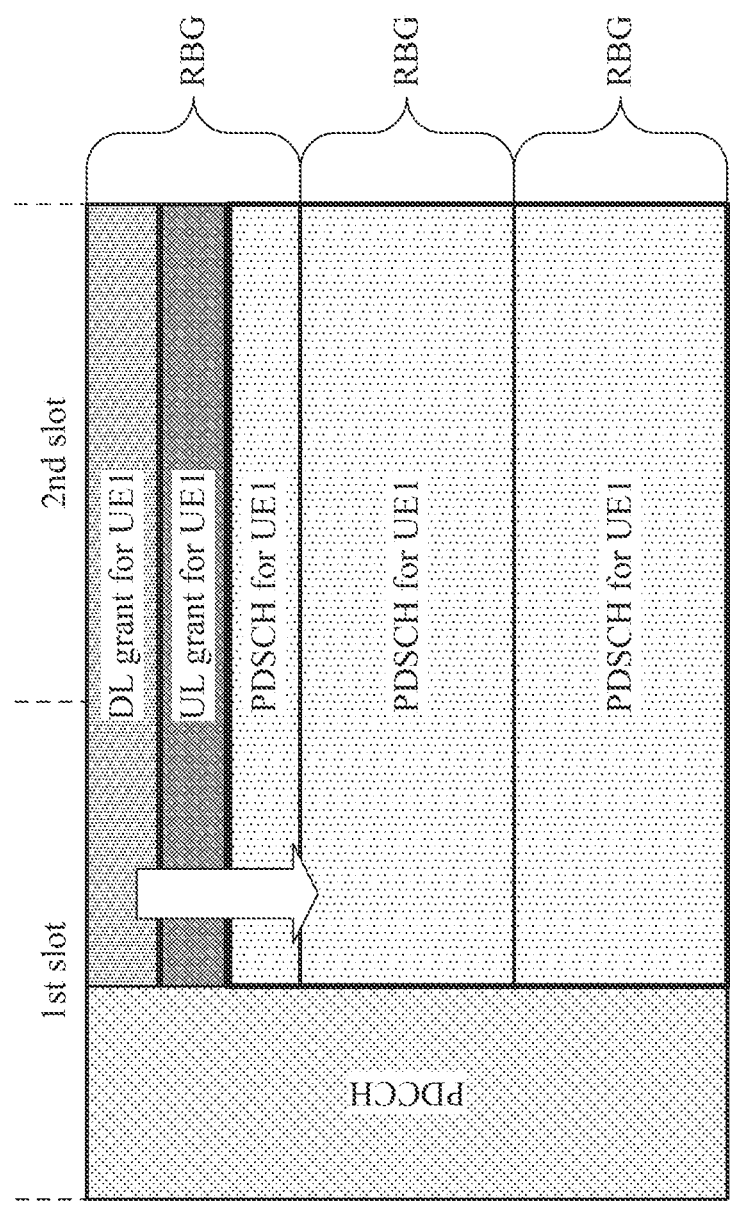
FIG. 3 illustrates a mapping example of DL grant and UL grant in E-PDCCH.
Figure 4:
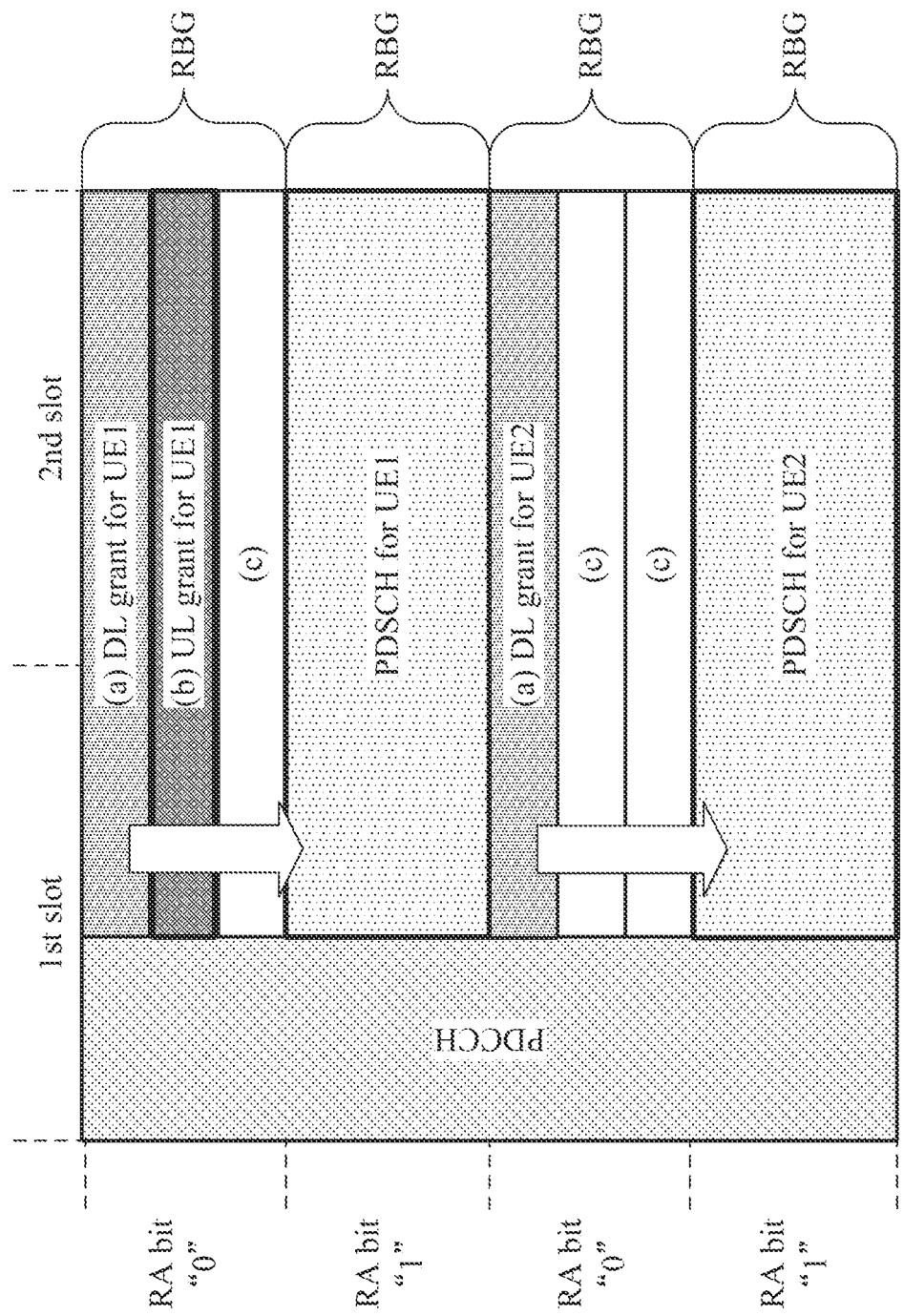
FIG. 4 is a diagram illustrating a mapping variation in the DL grant and the UL grant.

Embodiments of the present invention will be described in detail with reference to the drawings. In the embodiments, the same elements will be assigned the same reference numerals, and any duplicate description of the elements is omitted.

(Embodiment 1)
(Overview of Communication System)

A communication system according to Embodiment 1 of the present invention includes a transmission apparatus and a reception apparatus. Specifically, in this embodiment of the present invention, a description will be provided while the transmission apparatus is referred to as base station 100, and the reception apparatus is referred to as terminal 200. The communication system is an LTE-A system, for example. Base station 100 is an LTE-A base station, and terminal 200 is an LTE-A terminal, for example.

Figure 5:
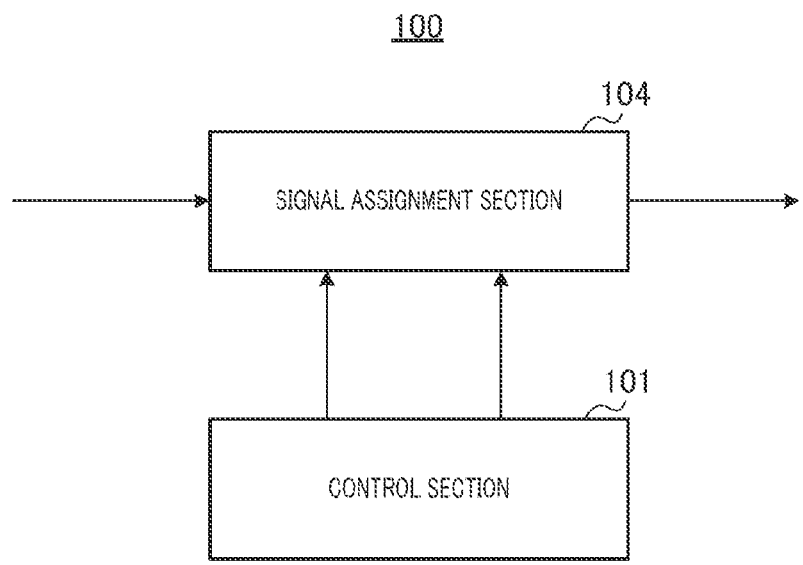
FIG. 5 is a block diagram illustrating a main configuration of a base station according to Embodiment 1 of the present invention.

FIG. 5 is a block diagram illustrating a main configuration of base station 100 according to Embodiment 1 of the present invention.

Base station 100 maps a control signal with respect to terminal 200 to a first resource region (here, E-PDCCH) that is usable for a control channel and a data channel and transmits the mapped control signal, and maps transmission data to a data resource region and transmits the mapped transmission data to terminal 200. Then, control section 101 generates an assignment control signal (DL grant or UL grant) for a data resource region, and in a resource block group (RBG) including a plurality of resource blocks (RB), sets a data resource region and a control resource region to which the assignment control signal is mapped, within a first resource region. Particularly, control section 101 sets at least one RB associated with an RB in which a first resource region is set, to be the data resource region. Then, signal assignment section 104 maps the transmission data to the data resource region that is set and maps the assignment control signal to the control resource region.

Figure 6:
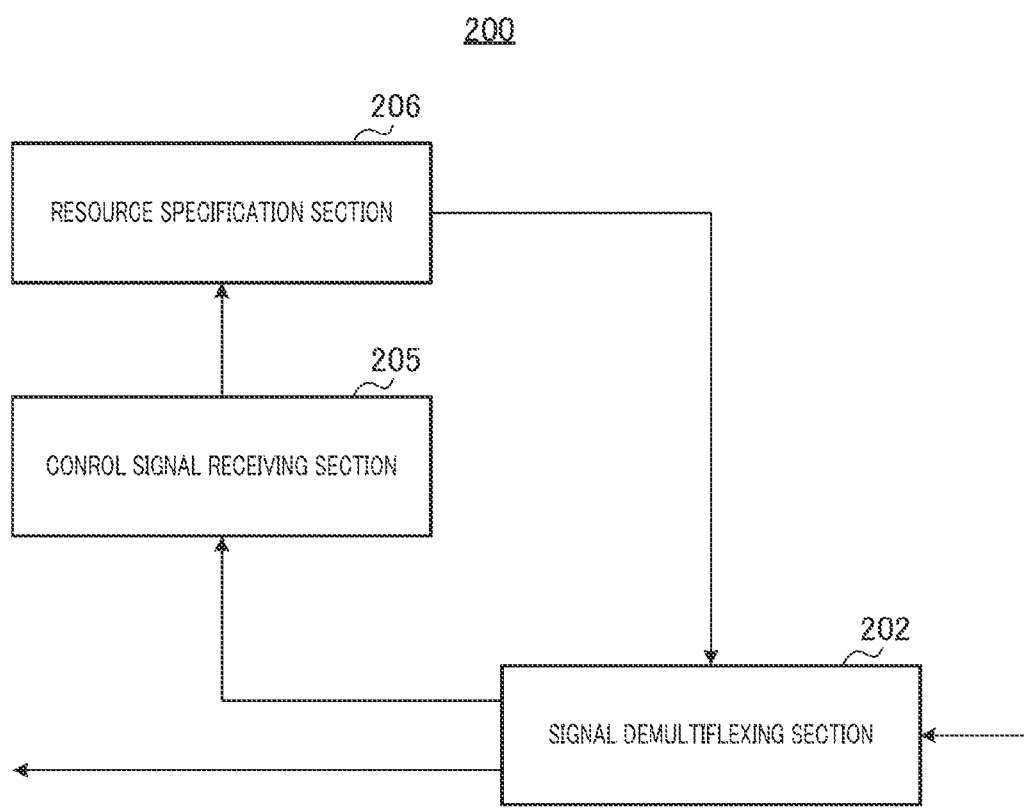
FIG. 6 is a block diagram illustrating a main configuration of a terminal according to Embodiment 1 of the present invention.

FIG. 6 is a block diagram illustrating a main configuration of terminal 200 according to Embodiment 1 of the present invention.

Terminal 200 receives a received signal that includes the control signal transmitted from base station 100 in the first resource region (here, E-PDCCH) that is usable in any one of the control channel and the data channel and receives the data transmitted from base station 100 that is mapped to the data resource region. Then, control-signal receiving section 205 is included in the received signal and detects the assignment control signal (the DL grant or the UL grant) for the data resource region. Then, resource specification section 206 specifies a data-component-extraction-target region that corresponds to the data resource region in the resource block group (RBG) that is configured from the plurality of RBs including the resource block (RB) from which the assignment control signal is detected. Then, signal demultiplexing section 202 extracts a signal component within the specified data-component-extraction-target region from the received signal. Particularly, the data-component-extraction-target region corresponds to an RB that is associated with an RB in which the assignment control signal is detected.

(Configuration of Base Station 100)

Figure 7:
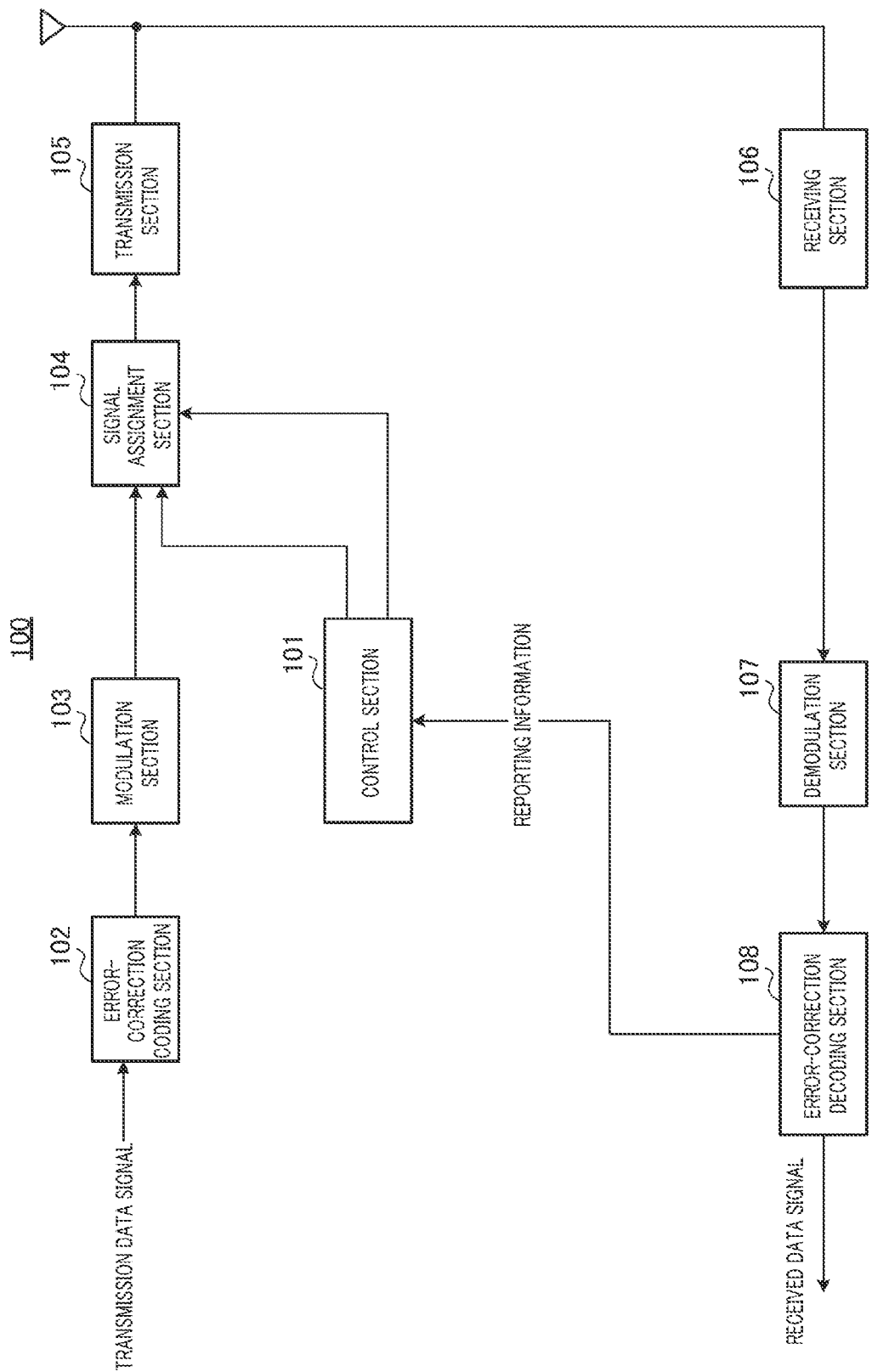
FIG. 7 is a main configuration diagram of the base station according to Embodiment 1 of the present invention.

FIG. 7 is a block diagram illustrating a configuration of base station 100 according to Embodiment 1 of the present invention. In FIG. 7, base station 100 includes control section 101, error-correction coding section 102, modulation section 103, signal assignment section 104, transmission section 105, receiving section 106, demodulation section 107, and error-correction decoding section 108.

Control section 101 inputs "reporting information" transmitted from terminal 200. "Reporting information" includes DL quality, a UL scheduling request, a buffer state report, and the like, which are transmitted from terminal 200.

Control section 101 performs transmission scheduling of the transmission data signal to generate the DL grant. Specifically, control section 101 determines a mapping resource of the control signal and a data signal according to a "mapping resource determination rule" of the control signal and the data signal. Information relating to the determined mapping resource is output to signal assignment section 104. In addition, control section 101 generates the DL grant including information relating to the mapping resource of the data signal. The generated DL grant is output to signal assignment section 104.

In addition, control section 101 generates the UL grant when a request for scheduling of an uplink data signal is included in the "reporting information" that is input. The generated UL grant is output to signal assignment section 104.

Figure 8:
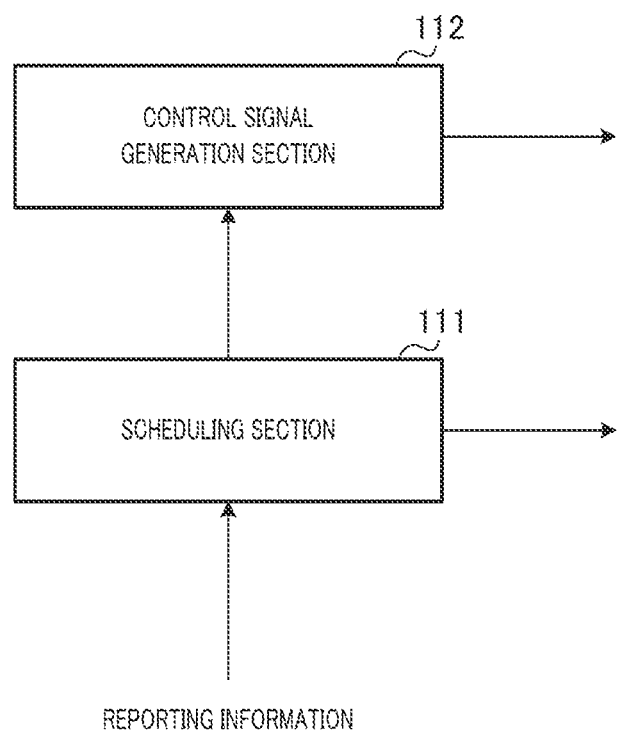
FIG. 8 is a block diagram illustrating a configuration of a control section.

Specifically, as illustrated in FIG. 8, control section 101 includes scheduling section 111 and control signal generation section 112.

Scheduling section 111 determines the mapping resource of the control signal and the data signal in accordance with the "mapping resource determination rule" of the control signal and the data signal. Basically, the "mapping resource determination rule" specifies the PRB pair to which the DL grant is mapped and a data resource (that is, one or a plurality of PRB pairs) which is indicated by such a DL grant and to which the data signal is mapped. The "mapping resource determination rule" according to this embodiment, in any assignment-target RBG, the PRB pair to which the DL grant is mapped and at least one PRB pair which is indicated by such DL grant and to which the data signal is mapped are associated. Specifically, in the "mapping resource determination rule" according to this embodiment, when the DL grant and the data resource that is indicated by the corresponding DL grant are mapped within one RBG, only a PRB pair associated with an RB number larger than the RB number of the PRB pair to which the DL grant is mapped is set to be the data resource.

Then, scheduling section 111 outputs information (hereinafter simply referred to as "mapping resource information") relating to the determined mapping resource of the control signal and the data signal to signal assignment section 104 and the control signal generation section 112 and outputs a DL grant generation instruction to control signal generation section 112.

In addition, when the request for scheduling of the uplink data signal is included in the "reporting information" that is input, scheduling section 111 outputs to signal assignment section 104 information relating to the resource that determines the resource to which the UL grant is mapped, and that outputs a UL grant generation instruction to control signal generation section 112.

When receiving the mapping resource information and the DL grant generation instruction, control signal generation section 112 generates the DL grant that includes the mapping resource information. The DL grant generated in this manner is output to signal assignment section 104.

In addition, when receiving the UL grant generation instruction, control signal generation section 112 generates the UL grant and outputs the generated UL grant to signal assignment section 104.

Error-correction coding section 102 sets the transmission data signal to be an input, performs error-correction coding on the transmission data signal that is input, and outputs the result to modulation section 103. At this point, the control signal, such as one for setting search space generated at a higher layer, is also included in the transmission data signal.

The modulation section 103 performs modulation processing on the signal received from error-correction coding section 102 and outputs the post-modulation transmission data signal to signal assignment section 104.

Signal assignment section 104 maps the DL grant that is received from the control section 101 and the post-modulation transmission data signal that is received from the modulation section 103, to the resource that is based on the mapping resource that is received from control section 101. In addition, signal assignment section 104 maps the UL grant that is received from control section 101 to the resource that is indicated by the information relating to the mapping resource of the UL grant that is received from control section 101. Such mapping of the transmission data signal and the control signal to a predetermined resource generates a transmission signal. Such a transmission signal is output to transmission section 105.

Transmission section 105 performs transmission processing, such as up-conversion, on an input signal and transmits the result.

Receiving section 106 receives the signal that is transmitted from terminal 200, performs reception processing, such as down-conversion, on the received signal, and then outputs the result to demodulation section 107.

Demodulation section 107 demodulates the input signals and outputs the demodulated signals to error-correction decoding section 108.

Error-correction decoding section 108 decodes the input signal and obtains the reporting information and a received data signal from terminal 200. The obtained reporting information from terminal 200 is output to control section 101. The received data signals are transmitted to the subsequent functional component.

(Configuration of Terminal 200)

Figure 9:
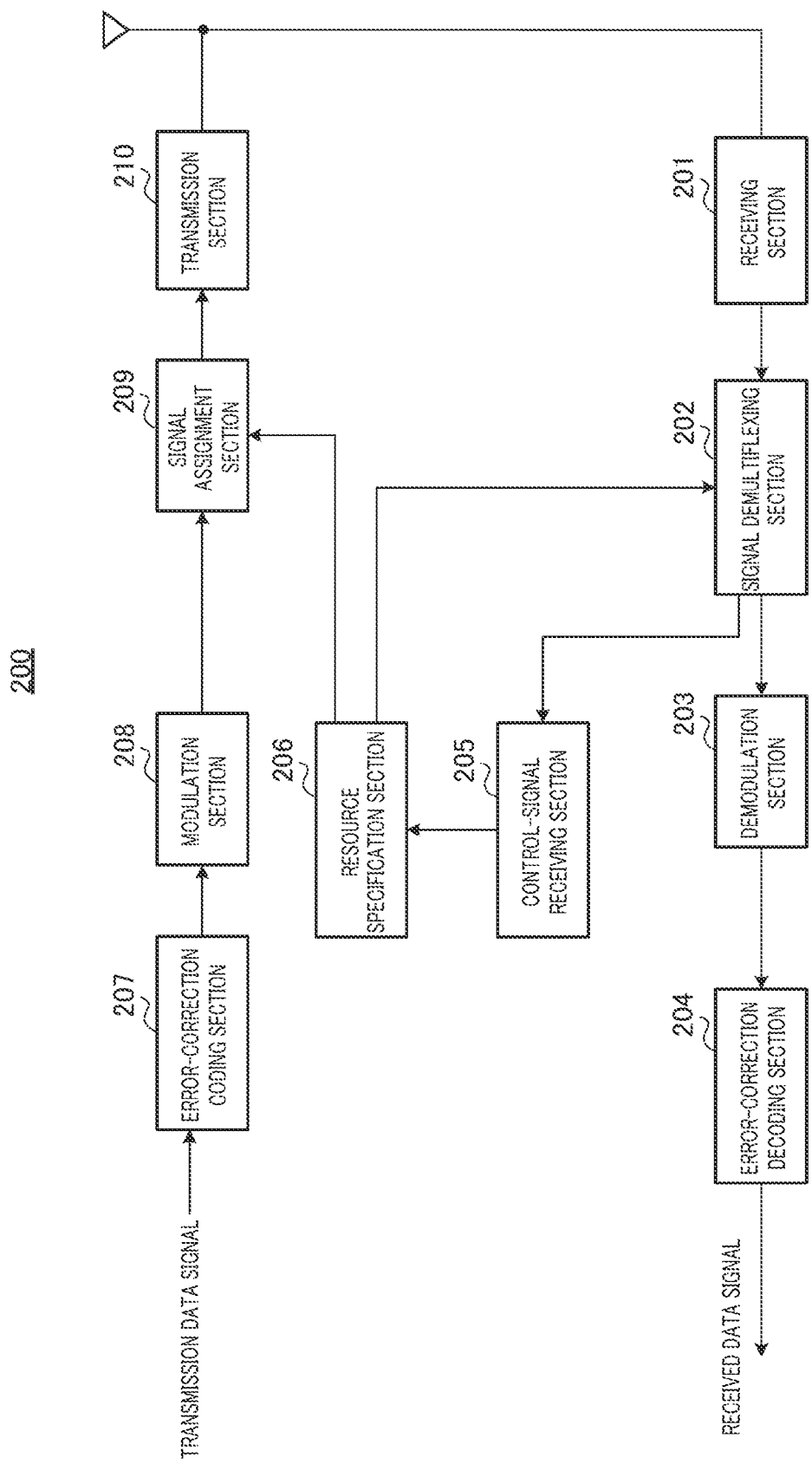
FIG. 9 is a block diagram illustrating a configuration of the terminal according to Embodiment 1 of the present invention.

FIG. 9 is a block diagram illustrating a configuration of terminal 200 according to Embodiment 1 of the present invention. In FIG. 9, terminal 200 includes receiving section 201, signal demultiplexing section 202, demodulation section 203, error-correction decoding section 204, control-signal receiving section 205, resource specification section 206, error-correction coding section 207, modulation section 208, signal assignment section 209 and transmission section 210.

Reception unit 201 receives the signal that is transmitted from base station 100, performs the reception processing, such as down-conversion, on the received signal, and then outputs the result to signal demultiplexing section 202.

The signal demultiplexing section 202 outputs the received signal that is received from receiving section 201, to control signal receiving section 205.

In addition, the signal demultiplexing section 202 extracts the signal component (that is, the signal component corresponding to the downlink data signal), corresponding to the data resource indicated by the mapping resource information that is output from resource specification section 206, from the received signal and outputs the extracted signal to demodulation section 203.

Demodulation section 203 demodulates the signals from signal demultiplexing section 202 and outputs the demodulated signals to error-correction decoding section 204.

Error-correction decoding section 204 decodes the demodulated signals outputted from demodulation section 203 and outputs the decoded received data signals.

Control-signal receiving section 205 extracts a signal component corresponding to the E-PDCCH region from the received signals to be received from signal demultiplexing section 202 and performs blind decoding on the extracted signal component to detect control signals (DL or UL grant) intended for the terminal 200. The detected control signal (DL grant or UL grant) intended for terminal 200 and the RB number from which the control signal is detected is output to resource specification section 206.

Resource specification section 206 specifies the data resource (that is, one or more PRB pairs) to which the downlink data signal is mapped, based on the RB number which is received from the control-signal receiving section 205 and from which the DL grant is detected and on a "mapping resource specification rule." At this point, the "mapping resource specification rule" is the same as the "mapping resource determination rule" in base station 100. That is, the "mapping resource specification rule" according to this embodiment, in an arbitrary assignment-target RBG, the PRB pair from which the DL grant is detected and at least one PRB pair which is indicated by such DL grant and to which the downlink data signal is mapped are associated. Specifically, the mapping resource specification rule" according to this embodiment, when the detected DL grant and the data resource that is indicated by the corresponding DL grant are mapped within one RBG, only a PRB associated with an RB number larger than the RB number of the PRB pair to which the detected DL grant is mapped is set to the data resource.

In addition, resource specification section 206 outputs assignment information that is included in the UL grant that is received from the control-signal receiving section 205, to signal assignment section 209.

Error-correction coding section 207 sets the transmission data signal to be an input, performs error-correction coding on such transmission data and outputs the result to modulation section 208.

Modulation section 208 modulates the signal that is output from error-correction coding section 207 and outputs the modulated signal to signal assignment section 209.

Signal assignment section 209 maps the signal that is output from modulation section 208, according to the assignment information that is received from resource specification section 206 and outputs the result to transmission section 210.

Transmission section 210 performs transmission processing, such as up-conversion, on the input signal and transmits the result.

(Operations of Base Station 100 and Terminal 200)

The operations of base station 100 and terminal 200 configured in the manner described above will be described.

In base station 100, control section 101 determines the mapping resource of the control signal and the data signal according to the "mapping resource determination rule" of the control signal and the data signal. In the "mapping resource determination rule" according to this embodiment, in any assignment-target RBG, the PRB pair to which the DL grant is mapped and at least one PRB pair which is indicated by such DL grant and to which the data signal is mapped are associated. Specifically, "the mapping resource determination rule" according to this embodiment, when the DL grant and the data resource that is indicated by the corresponding DL grant are mapped within one RBG, only a PRB pair associated with an RB number larger than the RB number of the PRB pair to which the DL grant is mapped is set to the data resource.

Figure 10A:
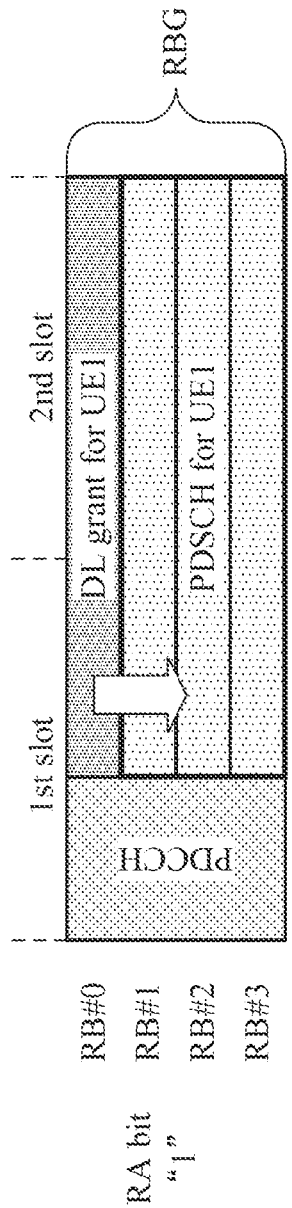
FIGS. 10A to 10C are diagrams that serve to describe a mapping resource determination rule according to Embodiment 1 of the present invention.
Figure 10B:
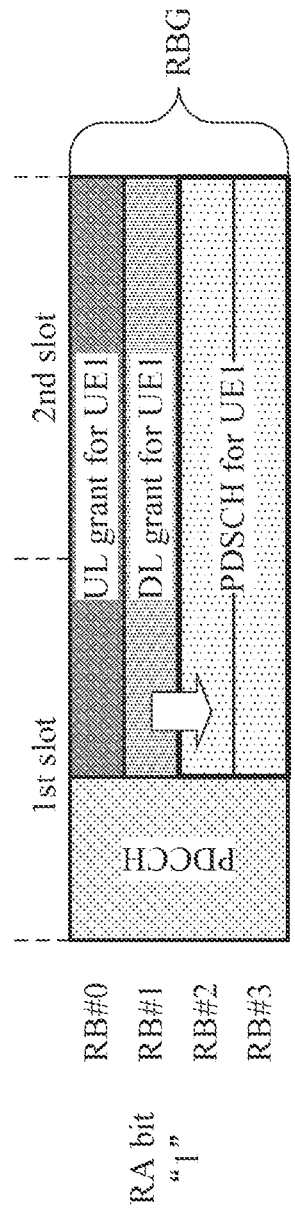
Figure 10C:
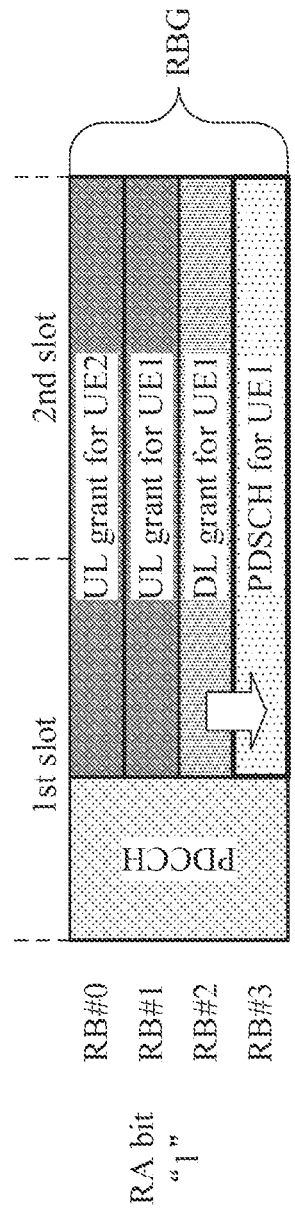

FIGS. 10A to 10C are diagrams that serve to describe the mapping resource determination rule according to Embodiment 1. FIGS. 10A to 10C illustrate an example in which RBG is configured from four PRBs.

According to the mapping resource determination rule according to Embodiment 1, as illustrated in FIG. 10A, when the number of the PRB pair to which the DL grant is mapped is RB#0 in the assignment-target RBG, the data resource is a PRB pair group corresponding to RB#1, RB#2 and RB#3 that are larger in number than RB#0.

In addition, as illustrated in FIG. 10B, when the number of the PRB pair to which the DL grant is mapped is PB#1 in the assignment-target RBG, the data resource is a PRB pair group corresponding to RB#2 and RB#3 that are larger in number than RB#1.

In addition, as illustrated in FIG. 10C, when the number of the PRB pair to which the DL grant is mapped is RB#1 in the assignment-target RBG, the data resource is a PRB pair corresponding to RB#3 that is larger in number than RB#1.

At this time, to the PRB pair associated with the RB number smaller than the RB number of the PRB pair to which the DL grant is mapped, the UL grant intended for terminal 200, which is an assignment-target by such DL grant, may be assigned, and PDSCH, the DL grant, or the UL grant, which is intended for a terminal different from such terminal 200, may be assigned.

The mapping resource information that is determined in control section 101 and the control signal that is generated in control section 101 are output to signal assignment section 104.

Signal assignment section 104 maps the control signal that is received from control section 101 and the post-modulation transmission data signal that is received from modulation section 103, to the resource that is based on the mapping resource information that is received from control section 101. Such mapping of the transmission data signals and the control signals to predetermined resources generates transmission signals. Such a transmission signal is transmitted to terminal 200 via transmission section 105.

Control-signal receiving section 205 in terminal 200 extracts a signal component corresponding to the E-PDCCH region from the received signal to be received from signal demultiplexing section 202 and performs blind decoding on the extracted signal component to detect the control signals (DL or UL grant) intended for terminal 200. The detected control signal (DL grant or UL grant) intended for terminal 200 and the RB number from which the control signal is detected is output to resource specification section 206.

Resource specification section 206 specifies the data resource (that is, one or more PRB pairs) to which the downlink data signal is mapped, based on the RB number which is received from the control-signal receiving section 205 and from which the DL grant is detected and on a "mapping resource specification rule."

For example, when RBG illustrated in FIG. 10A is transmitted from base station 100 to terminal 200, terminal 200 detects the DL grant intended for terminal 200 in PRB of which the RB number is RB#0. Because of this, resource specification section 206 specifies as the data resource the PRB pair group corresponding to RB#1, RB#2 and RB#3 which are larger in number than RB#0.

Then, the signal demultiplexing section 202 extracts the signal component (that is, the signal component corresponding to the downlink data signal), corresponding to the data resource indicated by the mapping resource information that is output from resource specification section 206, from the received signal and outputs the extracted signal to demodulation section 203.

According to this embodiment as described above, in base station 100, control section 101 sets only a PRB assigned a number larger than the number assigned to the PRB in which the control resource region is set, to be the data resource region, the control resource region being a region to which the downlink assignment control signal (that is, DL grant) is mapped.

By doing this, in terminal 200, if PRB from which the downlink assignment control signal is detected can be specified, because the data resource region can be directly specified, erroneous detection of the data resource region due to an error in detection of the uplink assignment control signal can be prevented.

In addition, according to this embodiment, in terminal 200, resource specification section 206 sets only a PRB assigned a number larger than the number assigned to the PRB in which the downlink assignment control signal is detected, to be the data-component-extraction-target region corresponding to the data resource region.

By doing this, if PRB from which the downlink assignment control signal is detected can be specified, because the data resource region can be directly specified, erroneous detection of the data resource region due to an error in detection of the uplink assignment control signal can be prevented. In addition, a delay in the reception processing can be prevented from being increased because the received data can start to be decoded without having to waiting for the decoding of the uplink assignment control signal.

Moreover, the mapping resource determination rule and the mapping resource specification rule that are described above can be applied in any of a case where the search space of the DL grant and the search space of the UL grant are the same, a case where the search space of the DL grant and the search space of the UL grant are different from each other, and a case where the search space of the DL grant and the search space of the UL grant are partly the same and are partly different.

Figures 11A, 11B:
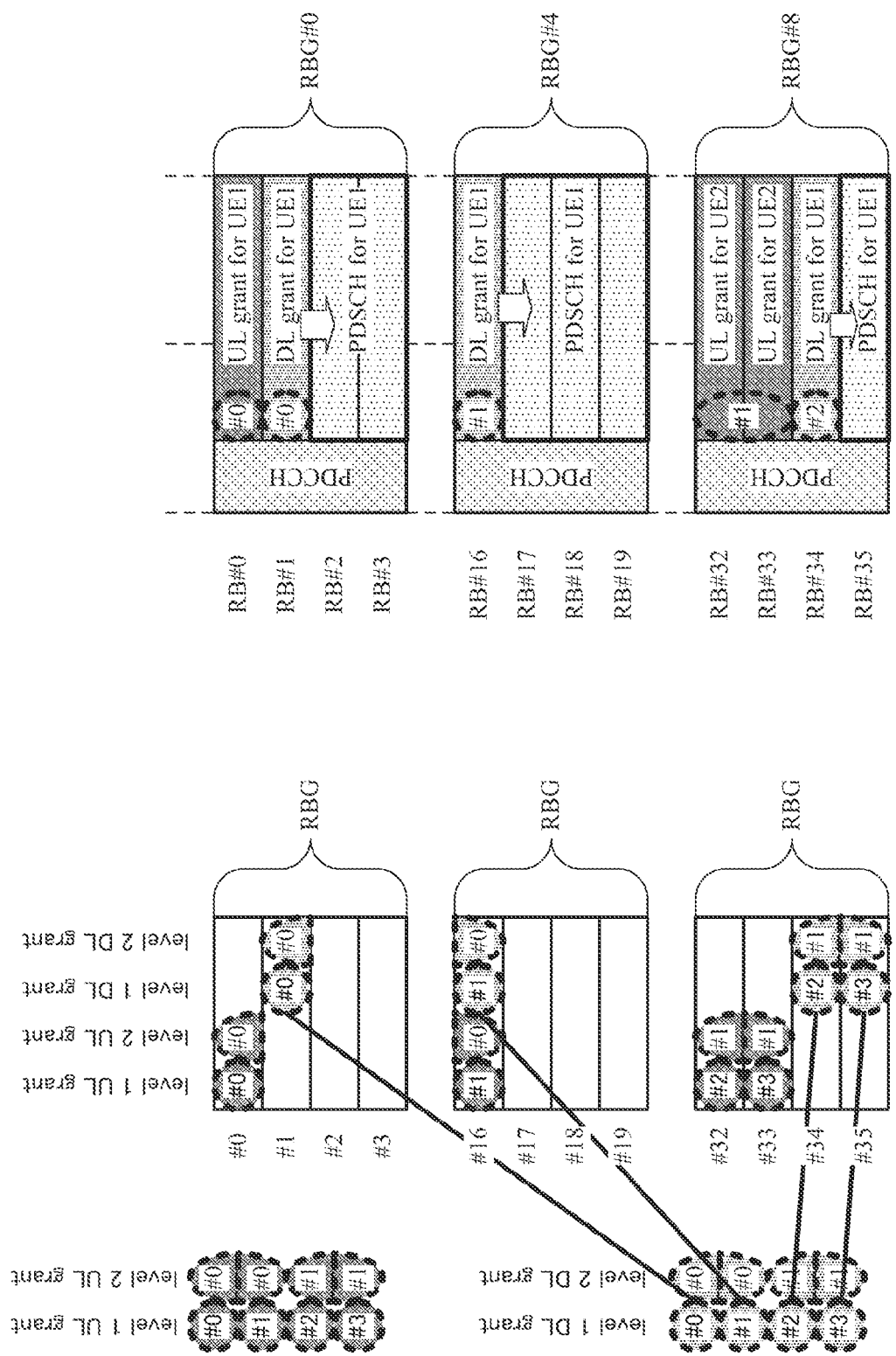
FIGS. 11A and 11B are diagrams that serve to describe application of the mapping resource determination rule and a mapping resource specification rule in the case where a search space of the DL grant and a search space of the UL grant are partly the same and are partly different.

At this point, as an example, the case where the search space of the DL grant and the search space of the UL grant are partly the same and are partly different is described. FIGS. 11A and 11B are diagrams that serve to describe application of the mapping resource determination rule and the mapping resource specification rule in the case where the search space of the DL grant and the search space of the UL grant are partly the same and are partly different. FIG. 11A is a diagram illustrating one example of the search space corresponding to E-PDCCH. FIG. 11B illustrates a plurality of RBGs to which the DL grant, the UL grant and PDSCH are mapped according to the mapping resource specification rule.

In FIG. 11A, the search spaces #0, #1, #2, and #3 of an aggregation level 1 of the UL grant are assigned to PRBs #0, #16, #32, and #33, and the search spaces #0, #1, #2, and #3 of the aggregation level 1 of the DL grant are assigned to PRBs #1, #16, #34, and #35. In addition, the search space #0 of an aggregation level 2 is the same as #0 and #1 of the aggregation level 1 and the search space #1 of the aggregation level 2 is the same as #2 and #3 of the aggregation level 1.

Terminal 200 determines that PDSCH is assigned to PRBs #2 and #3 that are larger in RB number than PRB #1 in a case where the DL grant is detected in RB#1 of RBG#0 and such DL grant indicates resource allocation of PDSCH in RBG#0. At this time, the UL grant may be assigned to PRB#0.

In addition, terminal 200 determines that PDSCH is assigned to PRBs #17, #18 and #19 that are larger in RB number than PRB #16 in a case where the DL grant is detected in RB#16 of RBG#4 and such DL grant indicates resource allocation of PDSCH in RBG#4.

In addition, terminal 200 determines that PDSCH is assigned to RB #35 that is larger in RB number than RB #34 in a case where the DL grant is detected in RB#34 of RBG#8 and such DL grant indicates resource allocation of PDSCH in RBG#8.

In addition, with regard to RBG from which the DL grant is not detected and to which PDACH is assigned, terminal 200 determines that PDSCH is assigned to all the PRBs within such RBG.

When the mapping resource determination rule and the mapping resource specification rule that are illustrated below in the manner according to Embodiment 1 are applied to the case where the search space of the DL grant and the search space of the UL grant are partly the same and are partly different, the resource allocation with respect to the DL grant and PDSCH are possible as described below. That is, like in RBG#4 in FIG. 11B, when RBG in which the search space of the DL grant is set to PRB with the smallest number within RBG is selected, the DL grant of the aggregation level 1 and PDSCH can be assigned to such RBG. In addition, like in RBG#8 in FIG. 11B, when RBG in which the search space of the UL grant is set to PRB with the first smallest number within RBG and the search space of the DL grant is set to PRB with the second smallest number within RBG is selected, the DL grant of the aggregation level 1, the UL grant of the aggregation level 1, and PDSCH can be assigned. In addition, like in RBG#0 in FIG. 11B, when RBG in which the UL grant is set to PRB with the first smallest number and the second smallest number within RBG and the DL grant is set to PRB with the third smallest number within RBG is selected, the DL grant of the aggregation level 1, the UL grant of the aggregation level 2, and PDSCH can be assigned.

As described above, when the search space of the DL grant and the search space of the UL grant are set in such a manner that they are partly the same and are partly different, because a place of the DL grant can be selected using the presence and absence of the UL grant or the size, PDSCH can be assigned without wasting resources.

In addition, in accordance with the mapping resource determination rule and the mapping resource specification rule that are described above, when the DL grant and the data resource that is indicated by the corresponding DL grant are mapped within one RBG, only the PRB pair associated with an RB number larger than the RB number of the PRB pair to which the DL grant is mapped is set to be the data resource. However, the present invention is not limited to this configuration, and if the DL grant and the data resource that is indicated by the corresponding DL grant are mapped within one RBG, only the PRB pair associated with an RB number smaller than the RB number of the PRB pair to which the DL grant is mapped may be set to be the data resource. In brief, in any assignment-target RBG, the PRB pair to which the DL grant is mapped and at least one PRB pair which is indicated by such DL grant and to which the data signal is mapped may be associated.

In addition, in accordance with the mapping resource determination rule and the mapping resource specification rule that are described above, the resource region to which the data resource is not assigned may be set to be common in all antenna ports.

In addition, the mapping resource determination rule and the mapping resource specification rule that are described above are effective particularly when a RBG size (that is, the number of PRBs that make up RBG) corresponds to three or more RBGs.

(Embodiment 2)

Embodiment 2 relates to a mapping resource determination rule and a mapping resource specification rule that are to be applied when the number of layers per one UE that is used in transmitting DL data is two or more. In embodiment 2, particularly, the case where the UL grant and the DL grant are transmitted from the same antenna port is described. At this point, as an example, particularly, a case where the UL grant and the DL grant are transmitted from a basic antenna port is described.

At this point, in the LTE-A system, the antenna port that is used in transmitting DM-RS is determined based on the number of layers per one UE that is used in transmitting the DL data and on a setting table. DM-RS (Demodulation Reference signal) is used in estimating a channel of DL data (that is, PDSCH). The DL data and DM-RS are transmitted from the same antenna port. This makes it possible to estimate the channel that uses DM-RS. At this point, the layer is equivalent to a stream that is frequently used in describing MIMO communication.

In addition, in the LTE-A system, the DL grant is transmitted from an antenna port 7. When the number of layers per one UE that is used in transmitting the DL data is 1, the antenna port 7 or an antenna port 8 is used for transmitting the DL data. In addition, when the number of layers per one UE that is used in transmitting the DL data is 2 or more, the antenna ports the number of which is the same as the number of layers are used for transmitting the DL data, in order of decreasing the antenna number from the antenna port 7. For example, when the number of layers is 4, the antenna ports 7, 8, 9, and 10 are used.

That is, in the LTE-A system, the DL grant is transmitted from a reference antenna port. When the number of layers per one UE that is used in transmitting the DL data is 1, the reference antenna port and a second antenna port are available as the antenna port that is used for transmitting the DL data. In addition, when the number of layers per one UE that is used in transmitting the DL data is 2, the antenna ports the number of which is the same as the number of layers are used for transmitting the DL data, in predetermined order starting with the reference antenna port. That is, when the number of layers per one UE that is used in transmitting the DL data is 2, the reference antenna port is necessarily used in transmitting the DL data.

In this manner, in R-PDCCH, the antenna port 7 is used. In contrast, for E-PDCCH, studies have been conducted on the use of the plurality of antenna ports.

Figures 12A, 12B:
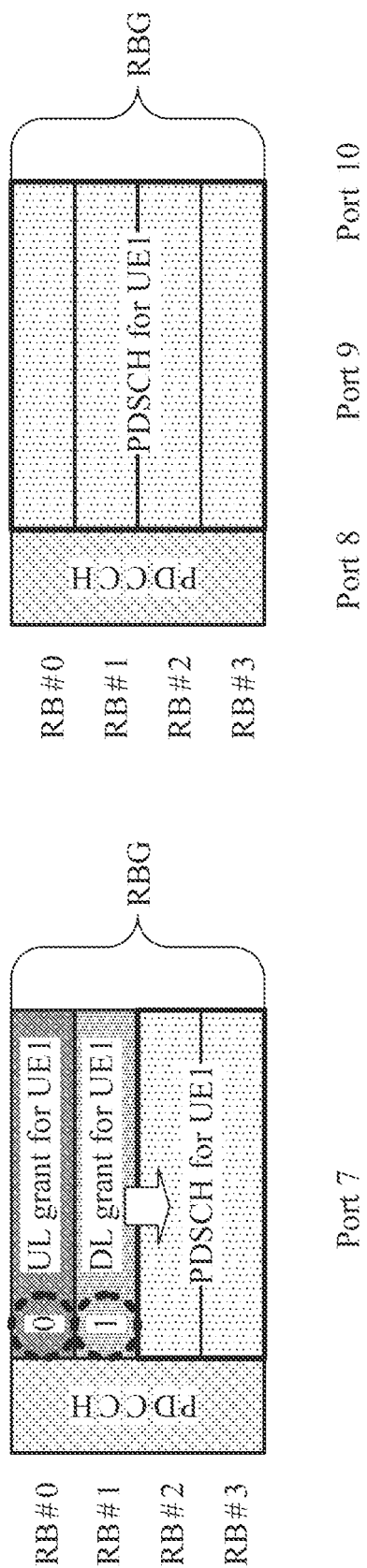
FIGS. 12A and 12B are diagrams that serve to describe a mapping resource determination rule and a mapping resource specification rule according to Embodiment 2.

Moreover, a base station and a terminal according to Embodiment 2 are described with reference to FIGS. 7 to 9 because they are the same as base station 100 and terminal 200 according to Embodiment 1, respectively. FIGS. 12A and 12B are diagrams that serve to describe a mapping resource determination rule and a mapping resource specification rule according to Embodiment 2. FIGS. 12A and 12B illustrate RBG in a case where the number of layers for PDSCH intended for an assignment-target terminal is 4.

In base station 100 according to Embodiment 2, control section 101 determines the mapping resource of the control signal and the data signal according to the "mapping resource determination rule" of the control signal and the data signal.

The mapping resource determination rule according to this embodiment is the same as the mapping resource determination rule according to Embodiment 1 in terms of the assignment-target RBG of the reference antenna port (refer to FIG. 12A). However, in accordance with the mapping resource determination rule according to this embodiment, in the assignment-target RBG of the antenna port different from the reference antenna port to which the UL grant and the DL grant are mapped, all PRBs that make up such RBG are set to be the data resource (refer to 12B).

In addition, in terminal 200 according to Embodiment 2, resource specification section 206 specifies the data resource (that is, one or more PRB pairs) to which the downlink data signal is mapped, based on the RB number which is received from the control-signal receiving section 205 and from which the DL grant is detected and on a "mapping resource specification rule." At this point, the "mapping resource specification rule" is the same as the "mapping resource determination rule" in base station 100 according to Embodiment 2.

(Embodiment 3)

Embodiment 3 relates to a mapping resource determination rule and a mapping resource specification rule that are to be applied when the number of layers per one UE that is used in transmitting DL data is two or more. According to Embodiment 3, particularly, a case where the UL grant and the DL grant are transmitted from different antenna ports is described. At this point, particularly, as an example, a case where the DL grant is transmitted from the basic antenna port is described. In addition, a base station and a terminal according to Embodiment 3 are described with reference to FIGS. 7 to 9 because they are the same as base station 100 and terminal 200 according to Embodiment 1, respectively. FIGS. 13A to 13C and FIGS. 14A to 14C are diagrams which serve to describe the mapping resource determination rule and the mapping resource specification rule according to Embodiment 3. FIGS. 13A to 13C and FIGS. 14A to 14C illustrate RBGs in a case where the number of layers for PDSCH intended for an assignment-target terminal is 4.

In base station 100 according to Embodiment 3, control section 101 determines the mapping resource of the control signal and the data signal according to the "mapping resource determination rule" of the control signal and the data signal. The mapping resource determination rule according to this embodiment is the same as the mapping resource determination rule according to Embodiment 1 in terms of the assignment-target RBG of the reference antenna port (refer to FIG. 13A and FIG. 14A). In addition, in accordance with the mapping resource determination rule according to this embodiment, in the assignment-target RBG of the antenna port that allows the mapping of the UL grant, PRBs that are the same in terms of the basic antenna port are set to be the data resource (refer to FIG. 13B and FIG. 14B). That is, in accordance with the mapping resource determination rule, the resource that is not the data resource is present in the assignment-target RBG of the basic antenna port and at least one more one antenna port. By doing this, the freedom of locating the UL grant is improved. However, in accordance with the mapping resource determination rule, in the assignment-target RBG of the antenna port to which none of the UL grant and the DL grant is mapped, all PRBs that make up such RBG are set to be the data resource (refer to FIG. 13C and FIG. 14C).

In addition, in terminal 200 according to Embodiment 3, resource specification section 206 specifies the data resource (that is, one or more PRB pairs) to which the downlink data signal is mapped, based on the RB number which is received from the control-signal receiving section 205 and from which the DL grant is detected and on a "mapping resource specification rule." At this point, the "mapping resource specification rule" is the same as the "mapping resource determination rule" in base station 100 according to Embodiment 3.

Figures 13A, 13B, 13C:
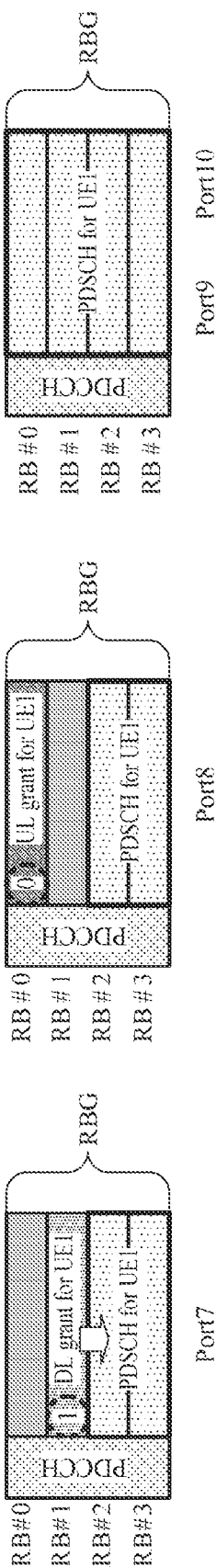
FIGS. 13A to 13C are diagrams that serve to describe the mapping resource determination rule and the mapping resource specification rule according to Embodiment 3.
Figures 15A, 15B, 15C:
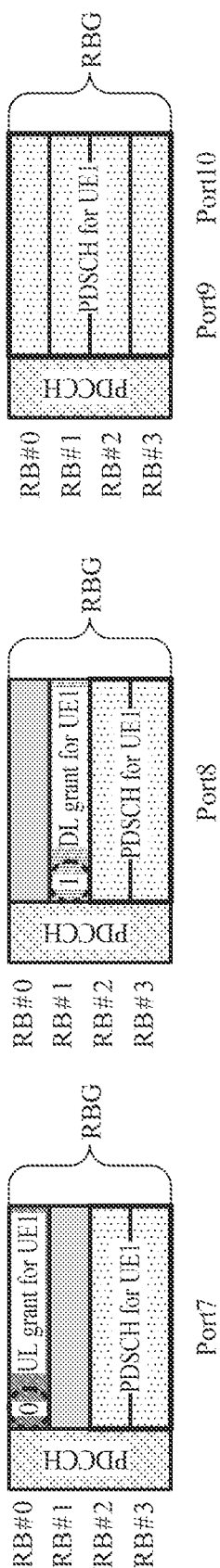
FIGS. 15A to 15C are diagrams that serve to describe a mapping resource determination rule and a mapping resource specification rule according to Embodiment 4.

Moreover, as illustrated in FIG. 13A and FIG. 13B, reception quality of the UL grant and the DL grant can be improved by mapping the UL grant and the DL grant to PRBs that are different in terms of the antenna port and are different in terms of the RB number.

In addition, when the reception quality is sufficiently good, as illustrated in FIG. 14A and FIG. 14B, an amount of resource that can be used as the data resource can be increased by mapping the UL grant and the DL grant to PRBs that are the same in terms of the antenna port and are the same in terms of the RB number.

(Embodiment 4)

Embodiment 4 relates to a mapping resource determination rule and a mapping resource specification rule that are to be applied when the number of layers per one UE that is used in transmitting DL data is two or more. In accordance with the mapping resource determination rule and the mapping resource specification rule according to Embodiment 4, in the assignment-target RBG, the antenna port number to which the UL grant is mapped is equal to or smaller than the antenna port number to which the DL grant is mapped. In addition, a base station and a terminal according to Embodiment 4 are described with reference to FIGS. 7 to 9 because they are the same as base station 100 and terminal 200 according to Embodiment 1, respectively. FIGS. 15A to 15C and FIGS. 16A to 16C are diagrams which serve to describe the mapping resource determination rule and the mapping resource specification rule according to Embodiment 4. FIGS. 15A to 15C and FIGS. 16A to 16C illustrate RBGs in a case where the number of layers for PDSCH intended for an assignment-target terminal is 4.

In base station 100 according to Embodiment 4, control section 101 determines the mapping resource of the control signal and the data signal according to the "mapping resource determination rule" of the control signal and the data signal. The mapping resource determination rule according to this embodiment is the same as the mapping resource determination rule according to Embodiment 1 in terms of the assignment-target RBG of the antenna port to which the DL grant is mapped (refer to FIG. 15B and FIG. 16A). However, in accordance with the mapping resource determination rule according to this embodiment, in the assignment-target RBG, the antenna port number to which the UL grant is mapped is equal to or smaller than the antenna port number to which the DL grant is mapped (refer to FIG. 15A and FIG. 15B). Then, when the UL grant and the DL grant are mapped to the allocation RBG of different antenna port, as in Embodiment 3, in the assignment-target RBG of the antenna port that allows the mapping of the UL grant, the PRB that is the same as the assignment-target RBG the antenna port, the same PRB as those in the assignment-target RBG of the antenna port to which the DL grant is mapped (refer to FIG. 15A and FIG. 15B). Then, in the assignment-target RBG of the antenna port to which none of the UL grant and the DL grant is mapped, all PRBs that make up such assignment-target RBG are set to be the data resource (refer to FIG. 15C, FIG. 16B, and FIG. 16C).

In addition, in terminal 200 according to Embodiment 4, resource specification section 206 specifies the data resource (that is, one or more PRB pairs) to which the downlink data signal is mapped, based on the RB number which is received from the control-signal receiving section 205 and from which the DL grant is detected and on a "mapping resource specification rule." At this point, the "mapping resource specification rule" is the same as the "mapping resource determination rule" in base station 100 according to Embodiment 4.

(Other Embodiments)

(1) In accordance with the mapping resource determination rule and the mapping resource specification rule according to Embodiment 1, when the DL grant and the data resource that is indicated by the corresponding DL grant are mapped within one RBG, only a PRB pair associated with an RB number larger than the RB number of the PRB pair to which the DL grant is mapped is set to be the data resource. In contrast, the mapping resource determination rule and the mapping resource specification rule may be employed that sets the PRB pair associated with a number smaller than the RB number of the PRB pair to which the DL grant is mapped, to be the data resource, depending on whether or not the PRB pair is the search space of the UL grant.

Figures 17A, 17B:
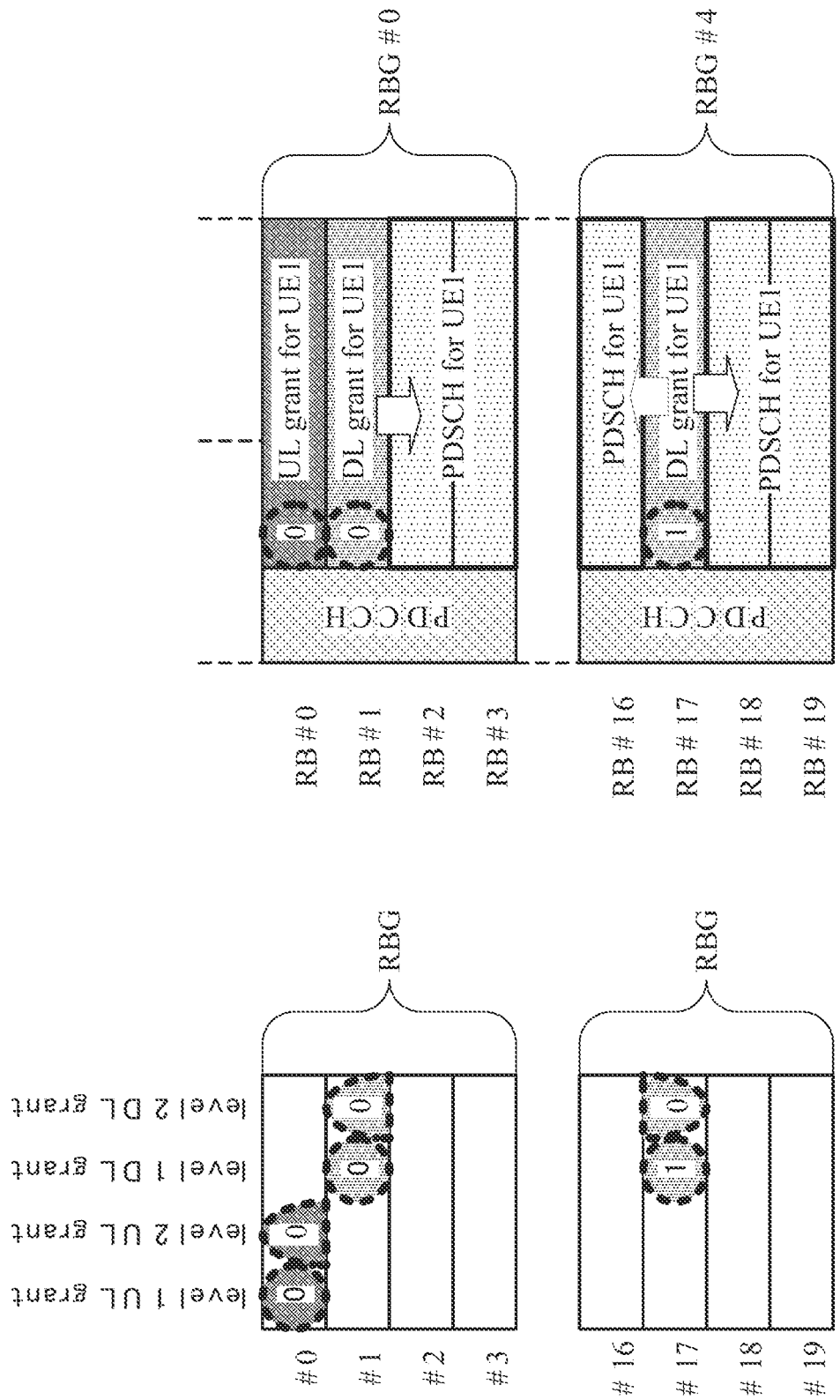
FIGS. 17A and 17B are diagrams that serve to describe a mapping resource determination rule according to other embodiments.

FIGS. 17A and 17B are diagrams that serve to describe a mapping resource determination rule according to other embodiments. As illustrated in FIG. 17A, because the search space of the UL grant is not set in PRB#16 of RBG#4, PRB#16 of RBG#4 may set to be the data resource as illustrated in FIG. 17B.

By doing this, a waste of resources can be prevented.

(2) In accordance with the mapping resource determination rule and the mapping resource specification rule according to Embodiment 2, in the assignment-target RBG of the antenna port different from the antenna port to which the UL grant and the DL grant are mapped, all PRBs that make up such RBG are set to be the data resource (refer to FIGS. 12A and 12B). In contrast, the mapping resource determination rule and the mapping resource specification rule may be employed in which PRB that is set to be the data resource in the assignment-target RBG of the antenna port different from the antenna port to which the UL grant and the DL grant are mapped should be consistent with PRB that is set to be the data resource in the assignment-target of the antenna port to which the UL grant and the DL grant are mapped.

(3) According to Embodiment 2 to Embodiment 4, the antenna port that is small in terms of a size of the data resource is present among the plurality of antenna ports. At this point, when the plurality of layers are assigned to PDSCH, with regard to data for the layer that is assigned to a first antenna port that is small in terms of a size of the data resource, the data is located in the same manner as with a second antenna port that is large in terms of the size of the data resource, and then a part corresponding to the resource other than the data resource in RBG of the first antenna port may be punctured. By doing this, a condition that amounts of resource in the data resource region should be equal between the layers, which is applied to when the number of layers is two or more, can be satisfied. In addition, because the transmission data corresponding to the part that overlaps the control resource region in the data resource region is not actually transmitted by the puncturing, a configuration on the receiving side does not need to be changed.

(4) According to Embodiment 4, in accordance with the mapping resource determination rule and mapping resource specification rule, a limitation to the antenna port number is provided. In contrast, the mapping resource determination rule and the mapping resource specification rule that provide a limitation to a code number may be employed.

That is, in accordance with the mapping resource determination rule and the mapping resource specification rule according to this embodiment, in the assignment-target RBG, a scrambling code number of the DL grant is equal to or less than a scrambling code number of the UL grant.

For example, two codes, a scrambling code 0 and a scrambling code 1, are set to be present. When in a certain PRB#n of the assignment-target RBG, the DL grant is detected by the scrambling code 1, and such detected DL grant assigns PDSCH to such assignment-target RBG, the terminal performs the reception processing such a manner that PDSCH is not assigned to RB of which a RB number is smaller PRB#n among the plurality of PRBs within such assignment-target RBG. In addition, in an RB assigned the RB number larger than PRB#n, the terminal performs the reception processing in such a manner that PDSCH is assigned.

In addition, when in a certain PRB#n of the assignment-target RBG, the DL grant is detected by the scrambling code 0, and such detected DL grant assigns PDSCH to such assignment-target RBG, the terminal performs the reception processing, in such a manner that in RB of which the RB number is smaller than PRB#n within the plurality of PRBs within such assignment-target RBG, PDSCH is not assigned in the scrambling code 0, and PDSCH is assigned to the scrambling code 1. In addition, in RB of which the RB number is larger than PRB#n, the terminal performs the reception processing in such a manner that PDSCH is assigned.

By doing this, if the UL grant and the DL grant are multiplexed with the scrambling code, the data are not further multiplexed when the UL grant and the DL grant are multiplexed, and the data can be multiplexed with the scrambling code when only the DL grant is present.

In addition, when the UL grant and the DL grant are assigned to the same RBG, or the same RBG is set to be the search space of the UL grant and the DL grant, the terminal may limit a candidate position of the UL grant, based on the PRB pair that detects the DL grant. For example, when the UL grant and the DL grant are located within the same RBG, by determining that the UL grant is located in the PRB pair of the RB number that is equal to or smaller than the RB number, for the detecting of the UL grant, it is not necessary to perform detection processing with the RB number larger than the RB number with which the DL grant is detected, within the same RBG, and the number of times that the detection is performed can be reduced.

That is, when a plurality of REs included in the same RBG are set to be the control resource region to which a downlink assignment control signal and an uplink assignment control signal are mapped, an RB corresponding to a second number not greater than a first number is set to be the control resource region to which the uplink assignment control signal is mapped. The first number is a number assigned to an RB in which the control resource region to which the downlink assignment control signal is mapped is set. In addition, when a plurality of REs that are set to be the control resource to which the downlink assignment control signal and the uplink assignment control signal are mapped are included in the same RBG, a control-resource-extraction-target region to which the uplink assignment control signal is mapped is set to be an RB corresponding to the second number not greater than the first number assigned to an RB in which the downlink assignment control signal is detected.

(5) According to the embodiments of the present invention described above, a location unit of E-PDCCH is described as being set to be the PRB pair, but a subcarrier unit that is obtained by further dividing the PRB pair or a unit that is obtained by combining the plurality of subcarriers may be a location unit of E-PDCCH. In this case, the mapping resource determination rule and the mapping resource specification according to the embodiments of the present invention described above may be applied to the subcarrier unit or the unit that is obtained by combining the plurality of subcarriers. In addition, even though the location unit of E-PDCCH is set to be the subcarrier unit or the unit that is obtained by combining the subcarriers, a minimum unit of data assignment may be set to be the PRB pair. That is, the mapping resource determination rule and the mapping resource specification rule according to the embodiments of the present invention described above by setting the PRB pair that includes the subcarrier that detects the DL grant, to the "PRB pair that detects the DL grant."

(6) The embodiments of the present invention described above are provided as hardware. The present invention can be achieved through software in cooperation with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-141683, filed on Jun. 27, 2011, including the specification, drawings and abstract, is incorporated herein by reference in its entirety.

INDUSTRIAL APPLICABILITY

A transmission apparatus, a reception apparatus, a transmission method, and a reception method are useful as being capable of preventing erroneous detection of a data resource region due to an error in detection of a control signal.

REFERENCE SIGNS LIST

100 Base station
101 Control section
102, 207 Error-correction coding section
103, 208 Modulation section
104, 209 Signal assignment section
105, 210 Transmission section
106, 201 Receiving section
107, 203 Demodulation section
108, 204 Error-correction decoding section
111 Scheduling section
112 Control signal generation section
200 Terminal
202 Signal demultiplexing section
205 Control signal receiving section
206 Resource specification section

The invention claimed is:

1. A transmission apparatus configured to map transmission data for a reception apparatus to a data resource region, to map a control signal to a predetermined resource region other than the data resource region and to transmit the transmission data and the control signal to the reception apparatus, the transmission apparatus comprising:
   a generation section that generates an assignment control signal for the data resource region, wherein the assignment control signal is a downlink assignment control signal that assigns a downlink data resource region and an uplink assignment control signal that assigns an uplink data resource region when a request for scheduling of an uplink data signal is included in a reporting information, or the assignment control signal is the downlink assignment control signal when the request for scheduling of the uplink data signal is not included in the reporting information;
   a setting section that sets the data resource region and a control resource region to which the assignment control signal is mapped, within the predetermined resource region in a resource block group (RBG) including four resource blocks (RBs) identified as RB#0, RB#1, RB#2, and RB#3; and
   a mapping section that maps the transmission data to the set data resource region and that maps the assignment control signal to the set control resource region, wherein
   the setting section sets RB#0 to be the RB to which the downlink assignment control signal is mapped when the assignment control signal is the downlink assignment control signal, sets RB#1 or RB#2 to be the RB to which the downlink assignment control signal is mapped when the assignment control signal is the downlink assignment control signal and the uplink assignment control signal, sets each of the four RBs identified by a number equal to or less than a number identifying the RB to which the downlink assignment control signal is mapped to be the control resource region, and sets each of the four RBs identified by a number larger than the number identifying the RB to which the downlink assignment control signal is mapped to be the data resource region.

2. The transmission apparatus according to claim 1, wherein a search space of the assignment control signal is set in the RBG.

3. The transmission apparatus according to claim 1, wherein the predetermined resource region is a resource region usable for a control channel and a data channel.

4. The transmission apparatus according to claim 1, the setting section sets RB#1 to be the RB to which the uplink assignment control signal for the reception apparatus is mapped and RB#0 to be the RB to which the uplink assignment control signal for another reception apparatus is mapped when the downlink assignment control signal is mapped to RB#2.

* * * * *